Sept. 21, 1926.

W. H. MARTIN

WAVE FILTER

Filed Oct. 6, 1921

1,600,290

2 Sheets-Sheet 1

INVENTOR
W. H. Martin
BY
ATTORNEY

Sept. 21, 1926.

W. H. MARTIN

WAVE FILTER

Filed Oct. 6, 1921

1,600,290

2 Sheets-Sheet 2

INVENTOR
W. H. Martin
BY
ATTORNEY

Patented Sept. 21, 1926.

1,600,290

UNITED STATES PATENT OFFICE.

WILLIAM H. MARTIN, OF NEW YORK, N. Y., ASSIGNOR TO AMERICAN TELEPHONE AND TELEGRAPH COMPANY, A CORPORATION OF NEW YORK.

WAVE FILTER.

Application filed October 6, 1921. Serial No. 505,838.

The principal object of my invention is to provide a new and improved network that shall distribute alternating electric currents in accordance with their frequency, so that they may be passed to certain circuits according to whether or not they lie within a certain frequency range. Another object of my invention is to make a wave filter of periodic recurrent structure, each section of which is a simple crossed or "bridge" network. All these objects and other objects of my invention will become apparent on consideration of a limited number of specific embodiments thereof which I shall disclose in the following specification, with the understanding that the scope of my invention is to be defined in the appended claims.

Figure 1:
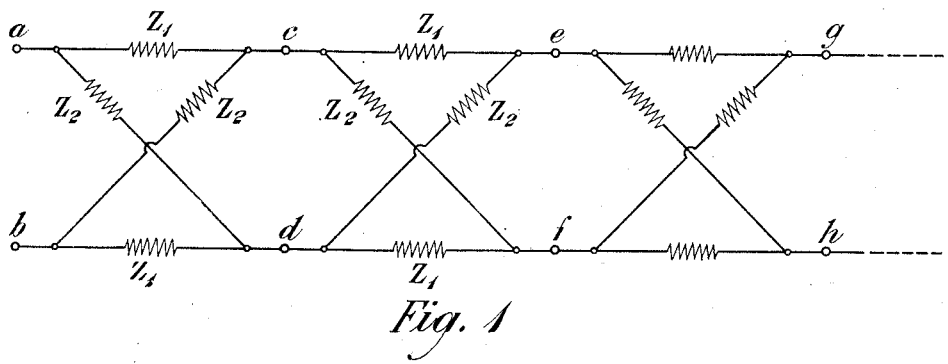
Figure 2:
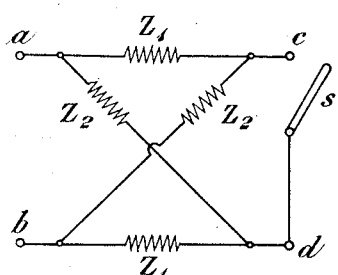
Figure 3:
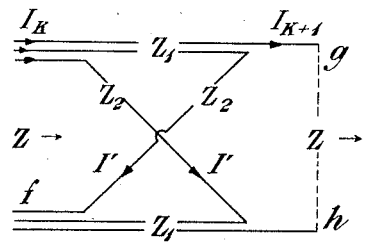
Figure 5:
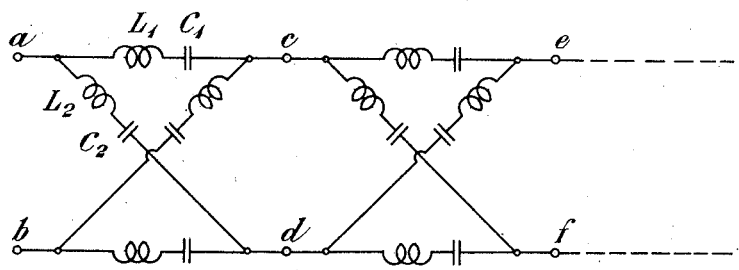
Figure 6:
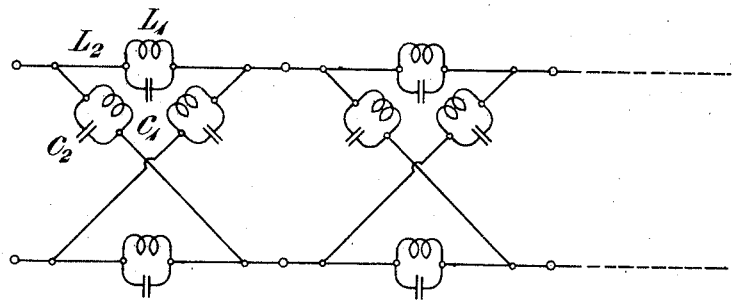
Figure 7:
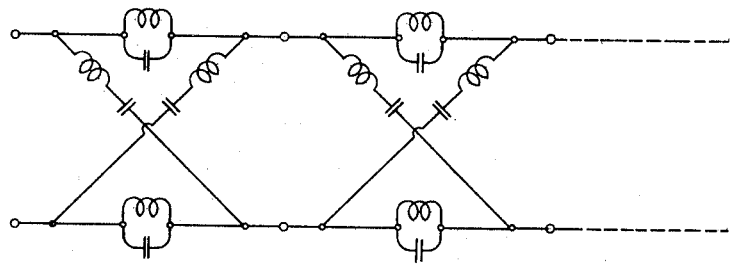
Figure 4:
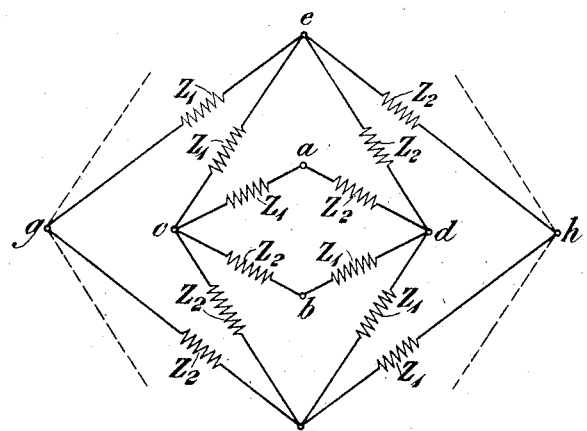

In the accompanying drawings, Figure 1 is a general diagram of my improved filter. Figs. 2 and 3 are diagrams that will be referred to in demonstrating the principles involved in the operation of this filter. Fig. 4 is an equivalent diagram of Fig. 1. Fig. 5 is an example under Fig. 1 in which the impedance elements are disclosed more specifically. Figs. 6 and 7 are diagrams of further modifications, being like Fig. 5, examples under Fig. 1.

My improved filter consists of like sections repeated in serial order as shown in Fig. 1. The first section $abcd$ is connected at points $c$ and $d$ to the second section $cdef$, and so on. Each section consists of four impedances equal in pairs, $z_1$ and $z_2$, connected as shown in the diagram.

The arms $ac$, $ad$, $bc$, $bd$ may be called internal arms to distinguish from the connections, whatever they may be external to the section from $a$ to $b$ and from $c$ to $d$.

The elementary theory of such periodic structures is commonly developed on the assumption that they are of infinite extent, and it may be shown that a practical embodiment having a finite number of sections will approximate in a satisfactory degree to the performance of the infinite structure provided a suitable termination is chosen. That mode of dealing with the subject will be employed here.

Assuming that the periodic structure shown in Fig. 1 extends indefinitely to the right, it is easily seen that, if an E. M. F. is applied across the terminals $ab$, the resulting current will have before it the paths $aceg$ ... $hfdb$ and $adeh$ ... $gfcb$ and various other paths, and, in general, it is to be expected that the current passing from section to section will be attenuated as one goes farther along the structure to the right.

Since the structure extends to infinity, the impedance across the points $a$ and $b$ in Fig. 1 looking to the right will be the same as across $c$ and $d$ looking to the right. This impedance will be called the characteristic impedance of the filter and will be designated by Z. The characteristic impedance could be obtained by replacing the structure to the right of $cd$ by Z and solving for Z by the ordinary Wheatstone bridge formula. This impedance however is more readily obtained by the following method.

It is a well known theorem in connection with networks of recurrent sections that the characteristic impedance Z may be found by taking the mean proportional of the impedance for a single section with its terminals open in one case and closed in the other case. Such a section is shown in Fig. 2 with a switch $s$. With the switch $s$ open, the impedance across $ab$ is $z_0 = \frac{1}{2}(z_1 + z_2)$. With the switch $s$ closed, the impedance $$z_c = \frac{2z_1 z_2}{z_1 + z_2}.$$

Multiplying these together and simplifying, we get $$Z = \sqrt{z_1 z_2} \quad (1)$$

In accordance with the usual procedure for such periodic structures, let the propagation constant $\Gamma$ be defined by the equation $$\epsilon^{-\Gamma} = \frac{I_{k+1}}{I_k} \quad (2)$$

where $I_k$ is the current through a pair of junction points, such as $e$ and $f$, and $I_{k+1}$ is the current through the next succeeding pair of such points $g$ and $h$. $\Gamma$ is a complex number and $\Gamma = \alpha + i\beta$, $\alpha$ being the attenuation constant and $\beta$ the wave length constant. We proceed to determine a formula for $\Gamma$ in the structure of Fig. 1.

By the symmetry of the structure, it is seen that the currents through the two impedances $z_2$ of a section are the same. Call these currents $I'$ for the section *efgh*. It will at once be seen that the currents in this section can be resolved into components as shown in Fig. 3, and, by Kirchhoff's laws, the following equations are obtained directly.

$$I_k Z = I' z_2 + (I' + I_{k+1}) z_1$$
$$I_{k+1} Z + (I' + I_{k+1}) z_1 = I' z_2$$

Eliminating $I'$ and simplifying, the following result is obtained:

$$\frac{I_{k+1}}{I_k} = \frac{\sqrt{z_2} - \sqrt{z_1}}{\sqrt{z_2} + \sqrt{z_1}} = \epsilon^{-\Gamma} \quad (3)$$

By the definition of the hyperbolic cosine, $\cosh \Gamma = \frac{1}{2}(e^{\Gamma} + e^{-\Gamma})$. Substituting from equations 2 and 3, we get for the structure of Fig. 1:

$$\cosh \Gamma = \frac{z_2 + z_1}{z_2 - z_1} \quad (4)$$

With the foregoing equations, we are prepared to investigate the filter properties of the structure of Fig. 1. Let it be assumed that the impedances $z_1$ and $z_2$ are pure reactances. This is a condition that can be approximated sufficiently in practice to make the results correspond closely with the theory. $z_1$ and $z_2$ being pure reactances, the right-hand term of equation 4 is a pure real number, and expanding the left-hand term of equation 4 and equating separately the real and imaginary terms, we get $\cosh \Gamma = \cosh (\alpha + i\beta) = \cosh \alpha \cos \beta + i \sinh \alpha \sin \beta$, whence $$\cosh \alpha \cos \beta = \frac{z_2 + z_1}{z_2 - z_1} \quad (5)$$

$$\sinh \alpha \sin \beta = 0 \quad (6)$$

From equation 6 we see that in all cases either $\alpha = 0$ or $\beta = 0$; and by equation 5, when $\alpha = 0$, then $$\cos \beta = \frac{z_2 + z_1}{z_2 - z_1}.$$

But $-1 < \cos \beta < +1$. Hence, when $\alpha = 0$, we have:

$$-1 < \frac{z_2 + z_1}{z_2 - z_1} < +1 \quad (7)$$

Of course $z_1$ and $z_2$ are functions of the frequency $$f = \frac{p}{2\pi},$$

and the foregoing inequality shows that the attenuationless or free transmitting range of frequencies lies between those frequencies for which $$\frac{z_2 + z_1}{z_2 - z_1} = -1$$

and $$\frac{z_2 + z_1}{z_2 - z_1} = +1,$$

which means that:

$$z_1 = \infty \text{ or } z_2 = 0 \quad (8)$$

at one end of the said frequency range, and:

$$z_1 = 0 \text{ or } z_2 = \infty \quad (9)$$

at its other end.

In Fig. 1 the two impedances $z_2$ are crossed and the two impedances $z_1$ are not crossed, but this condition would be reversed if the two points $c$ and $d$ were interchanged, likewise $g$ and $h$, and so on. The symmetrical relation of $z_1$ and $z_2$ is exhibited by Fig. 4, which is a diagram corresponding to Fig. 1 a may readily be determined by comparing the reference characters. Accordingly, when we investigate the filter properties of Fig. 1 with a certain type of impedance for $z_1$ and another type for $z_2$, we know that the properties will be the same if $z_1$ and $z_2$ are interchanged.

Specifically to illustrate the invention, we shall now investigate the filter properties for all those cases in which $z_1$ and $z_2$ each consist of an inductance and capacity in series or parallel and all cases which may be derived therefrom by omitting one or more of these reactance elements.

If $z_1$ and $z_2$ are each represented by a single coil or condenser, then there is no finite value of the frequency $f$ other than zero that will satisfy either equation 8 or 9, which shows that in such case the structure of Fig. 1 cannot act as a filter.

*Case I.*—Let $z_1$ and $z_2$ each be represented by a coil and condenser in series as in Fig. 5. Here $$z_1 = ipL_1 + \frac{1}{ipC_1} \quad (10)$$

$$z_2 = ipL_2 + \frac{1}{ipC_2} \quad (11)$$

In connection with equations 8 and 9 we notice that there is no finite value of $p$ that makes either $z_1$ or $z_2$ to be $\infty$, but that $z_1 = 0$, and $z_2 = 0$ respectively when $$p_a = \frac{1}{\sqrt{L_1 C_1}} \text{ and } p_b = \frac{1}{\sqrt{L_2 C_2}} \quad (12)$$

Equations 12 give the critical frequencies at the cut-off points between the attenuating and free transmitting ranges.

Since $\Gamma = \alpha + i\beta$ and $\alpha = 0$ in the free transmitting range, but $\beta = 0$ in the attenuating range, we see that in general $e^{-\Gamma}$ is complex or real according to whether the frequency lies within or without the free transmitting range. Substituting from equation 10 and 11 in equation 3, $$e^{-\Gamma} = \frac{\sqrt{p^2 L_2 - \frac{1}{C_2}} - \sqrt{p^2 L_1 - \frac{1}{C_1}}}{\sqrt{p^2 L_2 - \frac{1}{C_2}} + \sqrt{p^2 L_1 - \frac{1}{C_1}}} \quad (12^a)$$

For values of $p$ intermediate between the critical frequencies $p_a$ and $p_b$, $z_1$ and $z_2$ (which are functions of the frequency) have opposite signs. This is apparent if consideration be given to a plot of $z_1$ and $z_2$ as ordinates against $p$, on a common scale of abscissæ for $p$. It follows that the numerator and denominator of equation 3 are complex numbers whose quotient will in general be a complex number, showing that the filter transmits freely for such intermediate values of $p$. For frequencies outside this range, $z_1$ and $z_2$ always have the same sign, and $e^{-\Gamma}$ is always a real number, i. e., these frequencies are attenuated by the filter.

Thus it is seen that the structure of Fig. 5 is a band-pass filter, transmitting freely all frequencies between those given by equations 12 and attenuating higher and lower frequencies outside that range.

As special cases under Fig. 5, let the coil $L_1$ be removed, that is, let $L_1=0$. On referring to equations 12, we see that the effect of this is to make $p_a = \infty$, which means that the filter becomes a simple high-pass filter with its single critical or cut-off frequency corresponding to the value $p_b$.

Next, in Fig. 5 remove the condenser instead, that is, make $C_1 = \infty$; in the first of the equations 12 it will be seen that this makes $p_a=0$; that is, the filter becomes a simple low-pass filter with its single critical frequency corresponding to $p_b$.

*Case II.*—Let each impedance $z_1$ and $z_2$ be embodied in a coil and condenser in parallel as shown in Fig. 6. Here $$z_1 = \frac{ipL_1}{1 - p^2 L_1 C_1} \quad (13)$$

$$z_2 = \frac{ipL_2}{1 - p^2 L_2 C_2} \quad (14)$$

No finite value of $p$ makes either of these expressions to be 0, but when $z_1 = \infty$ or $z_2 = \infty$ we have respectively $$p_a = \frac{1}{\sqrt{L_1 C_1}} \text{ and } p_b = \frac{1}{\sqrt{L_2 C_2}} \quad (15)$$

answering to the conditions of equations 8 and 9 and giving the critical frequencies at the cut-off points between the ranges for free transmission and attenuation. Proceeding in a manner similar to that of Case I, we note that for low and high values of $p$ there is attenuation, but not for values intermediate between the critical frequencies $p_a$ and $p_b$. The structure of Fig. 6 is a band-pass filter like that of Fig. 5.

As a special case under Fig. 6 remove the inductance coil $L_1$. This makes $L_1 = \infty$ in the formulas and relegates the critical frequency $$f_a = \frac{p_a}{2\pi}$$

to 0 (equation 15), thus resulting in a low-pass filter with a single critical frequency corresponding to $p_b$.

Instead, remove the condenser $C_1$, that is, make $C_1=0$. Referring to equations 15, this relegates $$f_a = \frac{p_a}{2\pi}$$

to $\infty$, thus resulting in high-pass filter.

*Case III.*—Suppose that as shown in Fig. 7 the series impedances of each section consists of a condenser and a coil in parallel and the shunt impedances of each section consist of a condenser and a coil in series. Equations 13 and 11 give the values of $z_1$ and $z_2$ whence it follows that when $z_1 = \infty$ and $z_2 = 0$, then, respectively, $$p_a = \frac{1}{\sqrt{L_1 C_1}} \text{ and } p_b = \frac{1}{\sqrt{L_2 C_2}} \quad (16)$$

which give the critical or cut-off frequencies between the free transmitting and attenuating ranges. Substituting from equations 13 and 11 in equation 3 we find, according to a procedure similar to that followed under Cases I and II, that for small and large values of $p$, $e^{-\Gamma}$ of equation 3 is a complex number, but for intermediate values it is real. Hence, the filter of Fig. 7 is a band elimination filter attenuating all frequencies between $$\frac{p_a}{2\pi} \text{ and } \frac{p_b}{2\pi}$$

and likewise transmitting freely all frequencies outside this frequency range.

All the special cases obtained by omitting an element from the combination of Fig. 7 are identical with special cases already discussed under Case I and Case II. From the symmetry of the structure it is seen at once that if the series impedances $z_1$ consist of an inductance and capacity in series, and the shunt impedances of a capacity and inductance in parallel, the same filter is obtained.

Suppose it is desired to construct a filter that shall have a certain given cut-off frequency or certain given cut-off frequencies. From these frequencies and other parameters, the appropriate values for the impedance elements $L_1$, $C_1$ and $L_2$ and $C_2$ may be determined. This will be illustrated by an example. Suppose it is desired to get a band-pass filter of the type shown in Fig. 5. Here there are four unknown quantities to be determined—the L's and the C's. The following four equations, numbered 17 to 20, will serve to determine the L's and C's as functions of the given parameters, which are $p_a$, $p_b$, $Z_m$ and $p_m$, the last two of which will be explained presently. From equations 12 we have $$p_a^2 = \frac{1}{L_1 C_1} \quad (17)$$

$$p_b^2 = \frac{1}{L_2 C_2} \quad (18)$$

Let the impedance at midfrequency be assigned as $Z_m$. The midfrequency is defined to be the mean proportional of the frequencies corresponding to $p_a$ and $p_b$, that is, $$\sqrt{p_a p_b}.$$

Substituting this value of $p$ in equations 10 and 11 and, substituting the results in equation 1, we get:

$$Z_m^2 = -\frac{(1 - p_a p_b L_1 C_1)(1 - p_a p_b L_2 C_2)}{p_a p_b C_1 C_2} \quad (19)$$

We have left one choice of parameter, and we take this to be the frequency at which the attenuation becomes infinite, $p_m$. Referring to equation 4, it will be seen that this corresponds to the condition $z_1 = z_2$. Substituting from equations 10 and 11, we have the equation:

$$ip_m L_1 + \frac{1}{ip_m C_1} = ip_m L_2 + \frac{1}{ip_m C_2} \quad (20)$$

By choosing $p_m$ outside the free transmitting range, but only a little different from the adjacent value $p_a$ or $p_b$, we make the attenuation-frequency characteristic very steep at that end of the free transmitting range and thus give a very sharp cut-off.

I claim:

1. A filter comprising sections in serial order each connected to the adjacent section on each side at two points and each section being a bridge type network.

2. A filter comprising sections in serial order, each section being connected to the adjacent section on each side at two points, each section comprising four reactances, one each lying between each such point at one side and each such point at the other side.

3. A filter comprising sections in serial order each connected to the adjacent section on each side at two points, each section comprising four impedances, one each between each such point at one side and each such point at the other side.

4. A filter comprising sections in serial order each connected to the adjacent section on each side at two points, each section comprising four impedances, one each between such point at one side and each such point at the other side, the impedance between any two points being equal to that between the other two points.

5. A filter comprising sections each connected to other sections on one side at two points and on the other side at two points and comprising direct and crossed impedances between those points, said impedances being computed as functions of a certain definite frequency or frequencies so that the filter transmits freely over one range determined by said frequency or frequencies and attenuates over another such range.

6. A filter comprising sections each connected to other sections on one side by two points and on the other side by two points and comprising direct and crossed impedances between those points, said impedances being computed as functions of a certain definite frequency or frequencies so that the filter transmits freely over one range determined by said frequency or frequencies and attenuates over another such range and has maximum attenuation at a particular frequency in an attenuating range close to an end of that range.

7. A filter comprising sections each connected to other sections on one side by two points and on the other side by two points and comprising direct and crossed impedances between those points, certain of said impedances being computed to be at an extreme of resonance at certain frequencies, thus determining the cut-off frequency or frequencies between free transmitting and attenuating ranges.

8. A filter comprising sections, in serial order each connected at two points with the adjacent section in successive order, each section being a bridge type network with a condenser and inductance coil in at least one arm thereof.

9. A filter comprising sections, in serial order each connected at two points with the adjacent section in successive order, each section being a bridge type network with a condenser and inductance coil in series in at least one arm thereof.

10. A filter comprising sections, each of which is a bridge type network with a reactance element of one kind in each of the four arms thereof and an additional element of opposite kind in one of such arms.

In testimony whereof, I have signed my name to this specification this 30th day of September, 1921.

WILLIAM H. MARTIN.